United States Patent
Iaconis et al.

(10) Patent No.: US 11,063,396 B2
(45) Date of Patent: Jul. 13, 2021

(54) WALL-MOUNTED MULTIFUNCTIONAL ELECTRICAL RECEPTACLE

(71) Applicant: SHD Smart Home Devices Ltd., Burnaby (CA)

(72) Inventors: Jean-Louis Iaconis, Burnaby (CA); Jordan Anguelov, Burnaby (CA); Long Fei Zhao, Richmond (CA); Robert J. B. Taylor, Halfmoon Bay (CA)

(73) Assignee: SHD Smart Home Devices Ltd., Burnaby (CA)

( * ) Notice: Subject to any disclaimer, the term of this patent is extended or adjusted under 35 U.S.C. 154(b) by 116 days.

(21) Appl. No.: 16/077,984

(22) PCT Filed: Oct. 7, 2016

(86) PCT No.: PCT/CA2016/051176
§ 371 (c)(1),
(2) Date: Aug. 14, 2018

(87) PCT Pub. No.: WO2017/059546
PCT Pub. Date: Apr. 13, 2017

(65) Prior Publication Data
US 2019/0229478 A1    Jul. 25, 2019

Related U.S. Application Data

(60) Provisional application No. 62/238,654, filed on Oct. 7, 2015.

(51) Int. Cl.
*H01R 25/00* (2006.01)
*H02G 3/14* (2006.01)
*H01R 13/70* (2006.01)
*H01R 13/713* (2006.01)
*H01R 27/02* (2006.01)
(Continued)

(52) U.S. Cl.
CPC .......... *H01R 25/006* (2013.01); *H01H 83/02* (2013.01); *H01R 13/701* (2013.01); *H01R 13/7135* (2013.01); *H01R 27/02* (2013.01); *H02G 3/12* (2013.01); *H02G 3/14* (2013.01); *H04B 1/38* (2013.01); *H04N 5/2257* (2013.01);
(Continued)

(58) Field of Classification Search
CPC ............... H01R 25/006; H01R 13/701; H01R 13/7135; H01R 27/02; H01R 5/006; H02G 3/12; H02G 3/14; H01H 2300/03; H05K 5/0017; H04N 5/2257; H04N 7/183; H04B 1/38
See application file for complete search history.

(56) References Cited

U.S. PATENT DOCUMENTS 5,723,817 A    3/1998 Arenas
D424,523 S     5/2000 Hughes
(Continued)

FOREIGN PATENT DOCUMENTS

CN    202564656 U    11/2012

*Primary Examiner* — Briggitte R. Hammond
(74) *Attorney, Agent, or Firm* — Oyen Wiggs Green & Mutala LLP

(57) ABSTRACT

An electrical receptacle providing standard alternating current (AC) power connectors and multiple side-mounted auxiliary ports. Auxiliary ports may include direct current (DC) power delivery means, such as USB ports, and/or unpowered ports, such as audio/visual equipment connectors or network ports.

19 Claims, 11 Drawing Sheets

(51) Int. Cl.
  *H04B 1/38* (2015.01)
  *H04N 5/225* (2006.01)
  *H04N 7/18* (2006.01)
  *H05K 5/00* (2006.01)
  *H02G 3/12* (2006.01)
  *H01H 83/02* (2006.01)

(52) U.S. Cl.
  CPC ........... *H04N 7/183* (2013.01); *H05K 5/0017* (2013.01); *H01H 2300/03* (2013.01)

(56) References Cited

U.S. PATENT DOCUMENTS

| | | | |
|---|---|---|---|
| D463,367 S * | 9/2002 | Luu | D13/139.1 |
| 6,733,331 B2 * | 5/2004 | McCoy | H01R 9/2491 |
| | | | 439/281 |
| 6,943,296 B2 * | 9/2005 | Perrella | H02G 3/18 |
| | | | 174/66 |
| D521,001 S | 5/2006 | Xiao | |
| D523,397 S | 6/2006 | Maglionico | |
| 7,167,372 B2 * | 1/2007 | Mori | G06F 1/1632 |
| | | | 361/731 |
| 7,212,420 B2 * | 5/2007 | Liao | H01R 13/6675 |
| | | | 363/146 |
| 7,342,173 B1 | 3/2008 | Kidman | |
| D576,866 S | 9/2008 | Kidman | |
| D595,229 S | 6/2009 | LaGrotta | |
| 7,663,866 B2 | 2/2010 | Lee | |
| D611,900 S | 3/2010 | Yang | |
| D615,053 S | 5/2010 | Saari | |
| D628,157 S | 11/2010 | Su | |
| 7,887,341 B2 | 2/2011 | Liao | |
| D638,688 S | 5/2011 | Sheremeta | |
| 7,997,925 B2 * | 8/2011 | Lam | H01R 13/665 |
| | | | 174/66 |
| D645,443 S | 9/2011 | Maruyama | |
| 8,011,937 B2 * | 9/2011 | Oddsen | H01R 25/006 |
| | | | 439/107 |
| D646,683 S | 10/2011 | Tao | |
| D651,974 S | 1/2012 | Benedetti | |
| D660,131 S | 5/2012 | Tailor | |
| D667,736 S | 9/2012 | Stack | |
| D672,724 S | 12/2012 | Kajiura | |
| 8,384,241 B2 * | 2/2013 | Chen | H01R 31/065 |
| | | | 307/11 |
| D679,256 S | 4/2013 | Ericksen | |
| D680,953 S | 4/2013 | Kuo | |
| D682,206 S | 5/2013 | Farris-Gilbert | |
| D695,693 S | 12/2013 | Lee | |
| D699,183 S | 2/2014 | Zaslavsky | |
| D700,892 S | 3/2014 | Segnit | |
| 8,668,347 B2 * | 3/2014 | Ebeling | H01R 13/5213 |
| | | | 362/95 |
| 8,696,368 B2 * | 4/2014 | Quezada | H01R 13/665 |
| | | | 439/108 |
| 8,794,997 B2 * | 8/2014 | Tin | H02J 1/00 |
| | | | 439/535 |
| D718,243 S | 11/2014 | Scholeno | |
| D729,612 S | 5/2015 | de Peralta | |
| D731,430 S | 6/2015 | Segnit | |
| D734,253 S | 7/2015 | Tinaphong | |
| 9,083,180 B2 * | 7/2015 | Dodal | H02H 3/16 |
| D750,083 S | 2/2016 | Chow | |
| D753,063 S | 4/2016 | Gelonese | |
| D775,077 S | 12/2016 | Xu | |
| D776,056 S | 1/2017 | Block | |
| 9,536,686 B2 * | 1/2017 | Haraguchi | H01H 9/02 |
| D781,240 S | 3/2017 | Karlsson | |
| D793,397 S | 8/2017 | Eliyahu | |
| D794,028 S | 8/2017 | Lin | |
| D804,287 S | 12/2017 | Baldwin | |
| D804,429 S | 12/2017 | Baldwin | |
| D807,298 S | 1/2018 | Xu | |
| 9,887,500 B2 * | 2/2018 | Riner | H01R 13/743 |
| 9,941,642 B1 * | 4/2018 | Waggoner | H01R 13/66 |
| D826,860 S | 8/2018 | Iaconis et al. | |
| 10,062,533 B2 * | 8/2018 | Qureshi | G08B 13/2491 |
| 2003/0225954 A1 * | 12/2003 | Wu | G06F 11/325 |
| | | | 710/305 |
| 2004/0121648 A1 * | 6/2004 | Voros | H01R 13/6215 |
| | | | 439/535 |
| 2011/0192628 A1 * | 8/2011 | Robinson, Jr. | H02B 1/306 |
| | | | 174/66 |
| 2012/0027676 A1 | 2/2012 | Ho | |
| 2012/0094508 A1 * | 4/2012 | Tao | H01R 27/02 |
| | | | 439/76.1 |
| 2012/0170342 A1 * | 7/2012 | Manning | H05K 5/0278 |
| | | | 363/146 |
| 2013/0109219 A1 | 5/2013 | Liao | |
| 2015/0038006 A1 * | 2/2015 | Jansen | H02J 7/0021 |
| | | | 439/535 |
| 2015/0244121 A1 * | 8/2015 | Amelio | H01R 24/78 |
| | | | 439/345 |
| 2018/0375308 A1 * | 12/2018 | Rohmer | H05K 5/02 |

* cited by examiner

WALL-MOUNTED MULTIFUNCTIONAL ELECTRICAL RECEPTACLE

CROSS-REFERENCE TO RELATED APPLICATION

This application is a national stage entry under 35 U.S.C. § 371 of Patent Cooperation Treaty patent application No. PCT/CA2016/051176, which claims the benefit under 35 U.S.C. § 119 of U.S. Application No. 62/238,654 filed 7 Oct. 2015 and entitled WALL-MOUNTED MULTIFUNCTIONAL ELECTRICAL RECEPTACLE. Both of these application are hereby incorporated herein by reference for all purposes in their entireties.

FIELD

This invention relates to wall-mounted AC electrical receptacles and other devices that may be installed in wall-mounted electrical boxes and powered by AC line voltage. Example embodiments of the invention provide AC line power connectors which incorporate functionality such as, but not limited to, auxiliary USB outlet ports, surveillance/security cameras, data communication modems, AC power line switching means, and internet appliances.

BACKGROUND

In most conventional buildings, whether residential or commercial, electrical receptacles are placed on walls at regular intervals. This allows convenient distribution of AC electric power. In North America, each receptacle typically provides two AC power outlets. The configuration of the provided outlet(s) are usually dictated by the electrical standards of the geographical region in which it is utilized.

Devices such as portable computers, tablet computers, electronic book-readers, cordless and cellular telephones, security and surveillance cameras and many other devices, require a supply of direct current (DC) to power them and/or recharge onboard batteries. The conventional way to provide DC power to these electronic devices is to use power adapters which plug into AC electrical outlets. The power adapters convert AC line power to a regulated DC power output. However, such power adapters may be large and/or heavy and often obstruct adjacent electrical outlets when plugged in. In addition, such power adapters can be unattractive to look at.

As an alternative to the use of plug-in power adapters, electrical receptacles have recently been introduced which incorporate an AC-DC power converter within an otherwise standard electrical receptacle so as to provide both AC power outlets as well as regulated 5V DC output connectors in the form of one or more USB ports. An example is the Leviton™ model T5632-HGW USB wall plug. Although such multifunctional electrical receptacles eliminate the need for a separate power adapter while preserving the overall form factor of a standard duplex electrical receptacle, they can exhibit certain shortcomings.

One shortcoming of some such multifunctional electrical receptacles is that the USB port or ports occupy the physical location where one of the two standard AC outlets otherwise would be, thereby reducing the number of available AC outlets to a single outlet instead of two.

A second shortcoming is that, in an effort to avoid replacing one of the standard AC outlets with USB ports, the USB ports are placed in the space between the two AC outlets in a standard duplex electrical receptacle. In so doing, the USB ports are positioned too closely to the AC outlets, rendering it impossible to plug power cords into both AC outlets and cables into the USB ports simultaneously without obstructing each other or, at the very least, limiting the size of plugs that can be inserted into the AC outlets without obstructing the USB ports.

A third shortcoming of some such multifunctional electrical receptacles is their failure to preserve the aesthetic simplicity of conventional AC electrical receptacles. Auxiliary ports, typically USB receptacles, are located on the front face of the receptacle alongside the AC power outlets, which creates visual clutter.

A fourth shortcoming of some such multi-functional electrical receptacles is that they take the form of differently shaped large plastic boxes that protrude a significant distance from the wall. Thusly they are visually unappealing.

Another shortcoming of some such multi-functional electrical receptacles is that they are typically limited to not more than four USB outlets for DC power delivery, and those outlets are furthermore limited in the power they can deliver to plugged-in devices. This is largely due to the relatively low efficiency of the AC-DC power converter modules used in these devices, which result in excessive heat dissipation when operating at high power. While the delivered power levels of prior art multi-functional receptacles are typically suitable for charging most cellular phones, smartphones and portable music players, they are often incapable of charging these devices as rapidly as they would otherwise charge if using a dedicated plug-in power adapter. Furthermore, the delivered DC power level provided by such multi-functional receptacles may be insufficient for charging larger devices such as tablet computers.

There is a need for ways to provide power to a wide range of devices that avoids some or all of the above noted disadvantages of existing multi-function receptacles.

SUMMARY

One aspect of the present invention provides multifunctional electrical receptacles.

In one embodiment, a receptacle provides one or more auxiliary ports in addition to one or two standard AC power outlets. The auxiliary ports are disposed along the length of predominantly vertical surfaces along the sides of the electrical receptacle's wall plate and/or along the length of predominantly horizontal surfaces along the top and bottom of the electrical receptacle's wall plate. The auxiliary ports may have long dimensions arranged parallel to the wall surface. By arranging the auxiliary ports on different planes from the AC electrical outlets, obstruction of one or more auxiliary ports by even oversized plugs engaged with any of the AC electrical outlets is avoided. An additional advantage of such an arrangement is that the auxiliary ports being mounted around the peripheral edges of a wall plate can be partially or entirely hidden, preserving aesthetic simplicity. The auxiliary ports may be powered ports, such as USB receptacles (for example, type A, B or C), or multifunctional ports, such as audio/visual component connectors, network connections, RF based ports or others.

In embodiments wherein auxiliary ports comprise DC power connectors, an AC-DC power converter may be disposed within the multifunctional electrical receptacle in such a manner that it is hidden from view when the receptacle is wall-mounted in an electrical outlet box. The AC-DC power converter is electrically connected in parallel to the AC electrical outlet such that AC power is available to all AC outlets simultaneously as regulated DC power is supplied to the auxiliary ports. The AC-DC power converter may be connected to receive AC power from the same terminals which carry AC power to one or more AC outlets of the receptacle. Each of the AC and DC output connectors operate independently and do not interfere with the operation of any others.

The DC output voltage may be nominally 5V, if the auxiliary ports are USB receptacles, or other DC voltage(s) may be provided as necessary for other output port types or as a result of changes in USB standards. The AC-DC power converter incorporated in such an embodiment is designed to function at high efficiency, which minimizes heat dissipation, thereby enabling concurrent high-power charging of multiple USB devices. Some devices may require low-voltage AC power. In some embodiments, one or more auxiliary ports comprise low-voltage AC outlets. In such embodiments, an AC-AC power converter may be provided.

In embodiments wherein the auxiliary ports comprise unpowered component connectors, each port may serve as a pass-thru with an input connector within the portion of the electrical receptacle that resides within an electrical outlet box when wall-mounted, and an output connector accessible to the user along the external edges of the receptacle. Electrical circuitry for processing or filtering signals travelling through the receptacle may optionally be incorporated within the multifunctional receptacle. Incorporating unpowered audio/video and communication auxiliary ports into a multifunctional receptacle enables a duplex multifunctional receptacle to serve as a single interface for delivering both power and communication signals to multimedia devices such as networked computers, televisions or audio/visual and telecommunications equipment.

Some embodiments may further incorporate a detachable faceplate enabling the customization of the user-facing elements of the multifunctional receptacle. Such a faceplate may incorporate functional elements such as, but not limited to, touch-sensitive control elements, printed circuit boards, antennae or other user-interface or wireless communication-enhancing elements. Such a faceplate may also serve as a customizable aesthetic element for concealing internal functional elements of the multifunctional receptacle such as electronic components and mounting hardware, and enabling color, pattern or material coordination with other devices and accessories.

In addition, the present invention enables the provision of non-power functions to external wall-mounted AC electrical receptacles including but not limited to AC power line switching means, RF based communication modems, and surveillance/security cameras in addition to auxiliary USB outlet ports.

Another aspect of the invention provides an AC-powered device configured for mounting in a standard rectangular electrical box. The device may provide any of a broad range of functionality. These may include one or more of:
  one or more AC power outlets;
  security camera;
  wireless network connection point;
  power switch;
  remote control;
  thermostat;
  dimmer switch;
  intercom;
  keypad;
  etc.

The device includes a cover plate that covers the electrical box and provides one or more auxiliary ports arranged around a periphery of the cover plate. A front face of the cover plate may provide features for controlling and/or interacting with the AC-powered device.

One example aspect of the invention provides a multifunctional electrical receptacle for mounting to the wall of a structure. The structure is wired to provide AC current. For example, the structure may comprise a residential, public or commercial building and the structure may be wired to provide 120 Volt AC current. The receptacle comprises a base adapted to attach to the wall of the structure; and a removable faceplate attached to the base. The faceplate has a front face. A primary utility device such as for example a switch, a power receptacle, a thermostat, a security device or the like is accessible on the front face. A plurality of female auxiliary ports are disposed along one or more peripheral faces of the receptacle around a periphery of the front face. The electrical receptacle includes terminals for connecting the primary utility device to a source of AC current.

In some embodiments the primary utility device comprises a duplex AC electrical outlet which may optionally include a ground fault circuit interrupter (GFCI) or a light switch.

In some embodiments the primary utility device comprises a digital display. The digital display may, for example, be a display of a thermostat, programmable timer, lighting controller, camera, or graphical user interface.

In some embodiments the auxiliary ports comprise powered DC power outlets and the multifunctional receptacle includes an AC-DC power converter connected to supply low voltage DC current at the auxiliary ports. For example the powered DC power outlets may comprise USB ports. The USB ports may be connected to carry data or may be connected to provide electrical power or both. In some embodiments the auxiliary ports provide power for charging batteries of portable devices.

In some embodiments one or more of the auxiliary ports is an unpowered signal port. The signal port may, for example comprise an audio, video or network connector and the multifunctional receptacle may include one or more input connectors accessible for attaching one or more signal wires within the structure walls for supplying signals to and/or receiving signals from the one or more signal ports.

The multifunctional receptacle may comprise a wireless data transmitter and/or a wireless data receiver. The data transmitter/receiver may provide data communications for the primary utility device. The wireless data transceiver and/or the wireless data receiver may operates on a WIFI or Bluetooth™ or Zigbee™ or other suitable protocol.

In some embodiments the multifunctional receptacle comprises a security device such as a camera, an occupancy sensor, a motion detector, or a heat sensor.

In some embodiments the multifunctional receptacle comprises an AC utility switch.

Another example aspect of the invention provides apparatus comprising an in-wall portion sized for insertion into an electrical utility box mounted in a wall of a structure, the electrical utility box having a forward-facing opening. The apparatus includes a base attachable to the electrical utility box with the in-wall portion received within the electrical utility box. Electrical terminals are provided on the in-wall portion for connection to AC power wires within the electrical utility box. A power converter having an AC input is connected to receive AC power from the electrical terminals. A faceplate is attached to the base. The faceplate has a front face larger than the forward-facing opening of the electrical utility box, when the apparatus is installed in the electrical utility box. The front face is spaced apart from the wall by peripheral faces of the apparatus. A plurality of auxiliary ports are disposed along one or more of the peripheral faces, one or more of the auxiliary ports connected to receive power from an output of the power converter. The power converter may for example output AC or DC electrical power at a power and voltage level suitable for powering devices that may be connected to the auxiliary ports. For example the output of the power converter may be a voltage and current suitable for charging cellular telephones connected to the auxiliary ports. The output of the power converter has a voltage of less than 40 volts in some embodiments. In some embodiments the power converter outputs 5 volt DC power. In some embodiments the power converter is an AC to DC power converter and the power converter is connected to supply DC power to the one or more of the auxiliary ports.

In some embodiments the auxiliary ports comprise USB ports.

In some embodiments the faceplate projects no more than 2½ cm or 1½ cm outwardly from a front surface of the wall.

In some embodiments the auxiliary ports have a long dimension and a short dimension and are oriented with the long dimension parallel to the wall surface.

In some embodiments the plurality of auxiliary ports are oriented to receive corresponding mating connectors inserted in a direction parallel to the wall.

In some embodiments the faceplate overhangs the plurality of auxiliary ports.

In some embodiments the peripheral faces on which the auxiliary ports are disposed are oriented generally perpendicularly to the front face.

In some embodiments face plate is rectangular, having two longer sides and two shorter sides and the auxiliary ports are located on one or both of the peripheral faces that extend along the longer sides of the faceplate. In some embodiments two to four of the auxiliary ports are provided along both of the peripheral faces that extend along the longer sides of the faceplate.

In some embodiments he apparatus has in the range of two to eight of the auxiliary ports.

In some embodiments the apparatus provides one or more of the auxiliary ports on each of at least two of the peripheral faces.

In some embodiments the electrical terminals include an electrical terminal on a first side of the in-wall portion and an electrical terminal on a second side of the in-wall portion.

Some embodiments comprise an AC power receptacle on the front face. The AC power receptacle can be connected to receive AC electrical power by way of the electrical terminals. In some embodiments he AC power receptacle is a duplex receptacle. In some embodiments a ground fault circuit interrupter is connected to protect the AC power receptacle.

In some embodiments the apparatus comprises a camera, the camera connected to receive power by way of the electrical terminals and having a lens on the front face of the faceplate.

In some embodiments the front face of the faceplate carries one or more of: a digital display; a switch; a user interface, a user control, a motion sensor, an occupancy sensor, and a heat sensor.

In some embodiments the apparatus comprises a wireless data communication module connected to receive power by way of the electrical terminals.

In some embodiments the apparatus comprises a thermostat, a security camera, a remotely-controllable switch, a programmable timer or a lighting controller connected to transmit or receive data by way of the data communication module.

In some embodiments one or more of the auxiliary ports is an unpowered signal port. The signal port may for example comprise an audio, video or network connector and the apparatus may include one or more input connectors accessible for attaching one or more signal wires within the electrical utility box for supplying signals to and/or receiving signals from the signal port.

Another example aspect of the invention provides apparatus useful for covering an electrical utility box, the apparatus comprising: a base apertured to receive fasteners for attaching the base to the electrical utility box; a rectangular faceplate attachable to the base, the faceplate having a front face; peripheral faces extending around the base and oriented generally perpendicularly to the faceplate; and a plurality of auxiliary ports located on one or more of the peripheral faces. Such apparatus may be applied, for example to provide auxiliary ports that may be used to charge or otherwise connect to portable electronic devices such as cellular telephones.

In some embodiments the front face is formed with an aperture shaped to expose an electrical device such as a switch or electrical receptacle.

In some embodiments the faceplate overhangs the plurality of auxiliary ports.

In some embodiments the face plate is rectangular, having two longer sides and two shorter sides and the auxiliary ports are located on one or both of the peripheral faces that extend along the longer sides of the faceplate.

In some embodiments two to four of the auxiliary ports are provided along both of the peripheral faces that extend along the longer sides of the faceplate.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

One aspect of the present invention is directed to multifunctional electrical receptacles which may be configured with a variety of auxiliary ports within the form factor of a standard wall-mounted duplex electrical receptacle. Such receptacles may be installed within a standard electrical receptacle box to provide functionality in addition to one or more AC outlets.

Reference is made below to specific elements, numbered in accordance with the attached figures of one embodiment and several variations of that embodiment. The discussion below should be taken to be exemplary in nature and not as limiting of the scope of the present invention. The scope of the present invention is defined in the claims and should not be considered as limited by the implementation details described below, which, as one skilled in the art will appreciate, can be modified by replacing or rearranging elements with equivalent functional or aesthetic elements.

Figure 1:
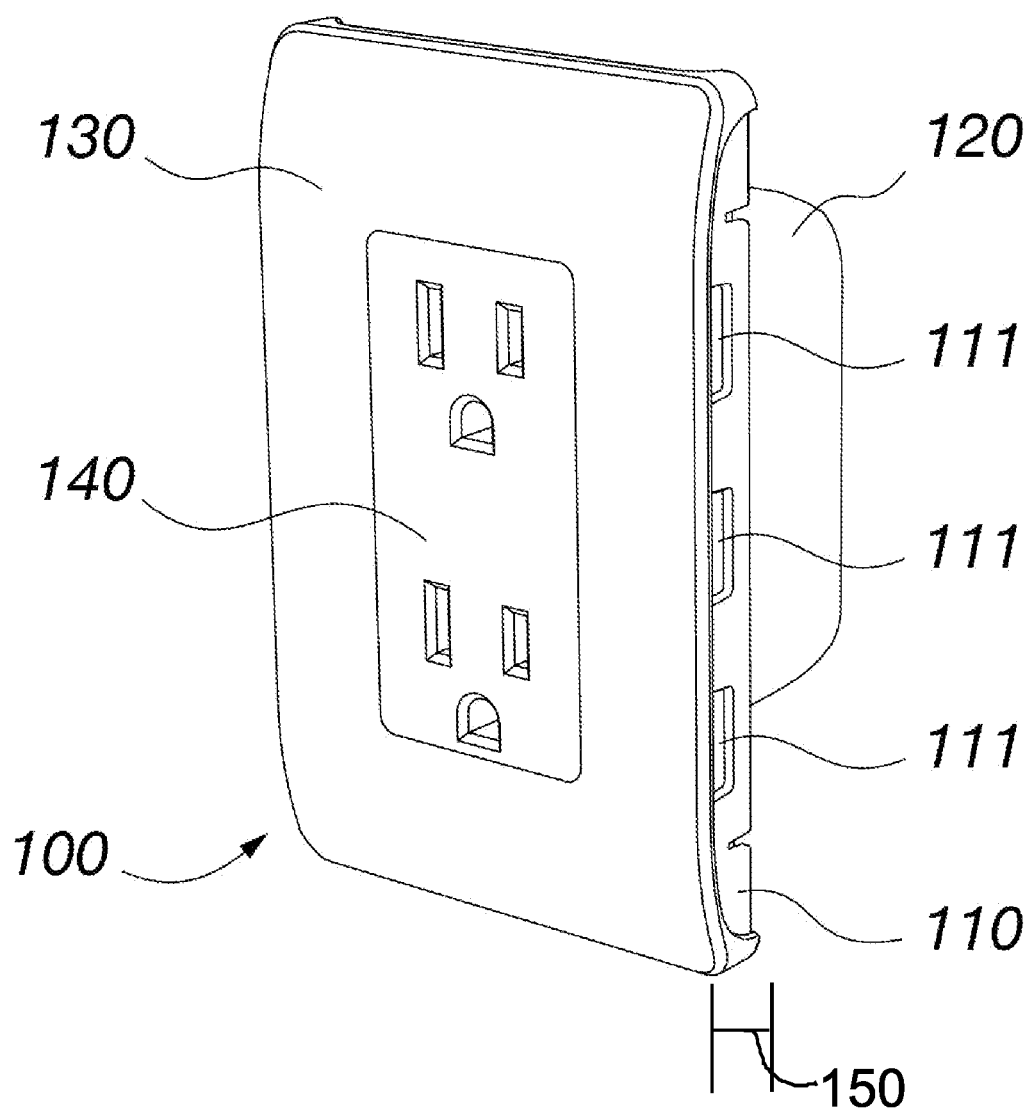
FIG. 1 is a perspective view of a multifunction receptacle having two AC electrical outlets and USB ports disposed along each vertical side according to an example embodiment.

FIG. 1 shows a wall-mounted multifunctional electrical receptacle 100 in accordance with a first example embodiment of the present invention. Receptacle 100 comprises a base 110, auxiliary ports 111, an in-wall portion 120, a faceplate 130 and AC electrical outlets 140.

Figure 2:
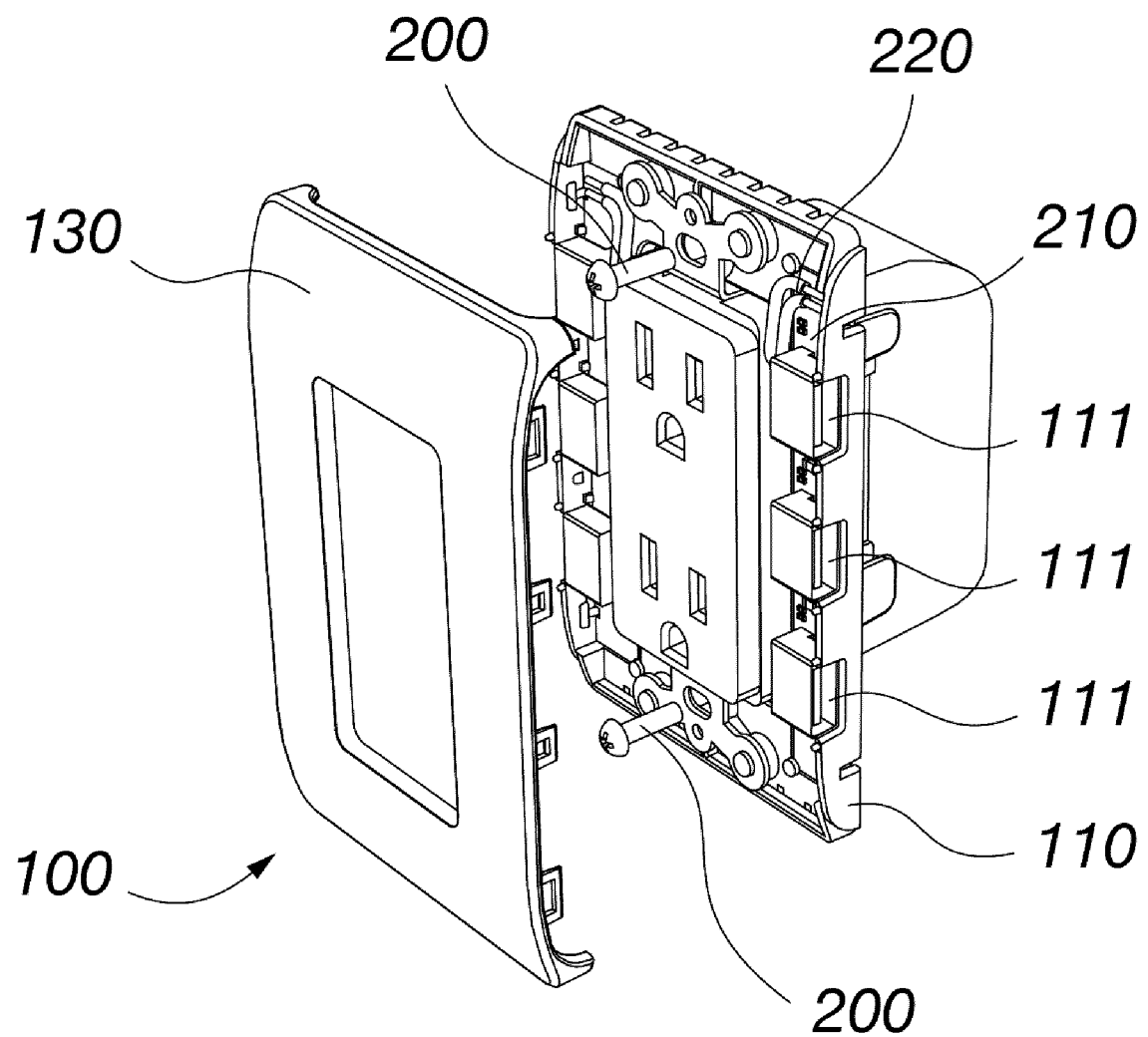
FIG. 2 is a first exploded perspective view of the receptacle of FIG. 1 with a faceplate removed to reveal internal components.

According to various embodiments, the base 110 is preferably formed as a wall plate such that it may be secured to a wall-mounted electrical outlet box, in place of a standard wall plate, with screws 200 as illustrated in FIG. 2 similarly to the manner in which a typical wall plate is installed over an outlet box. Base 110 may be fabricated from an electrically insulating material, such as a thermoplastic or thermoset material compatible with relevant electrical safety standards and consumer product safety requirements as may be applicable in each geographical region of use. Alternative materials of construction are also possible, including metals, woods, ceramics, glasses and composite materials provided they do not create electrical short circuits or pose potential fire or other hazards that may preclude them from meeting applicable electrical safety standards.

Faceplate 130 is configured to project far enough forward from base plate 110 to accommodate auxiliary ports 111 along its edges. Since many types of auxiliary ports 111 are small in at least one dimension, faceplate 130 does not need to project very far past a wall surface. In some embodiments, faceplate 130 projects less than 2½ cm, less than 1½ cm in some embodiments, as indicated by distance 150.

Auxiliary ports such as USB connectors which have a long dimension and a short dimension may be oriented with the long dimension parallel to the wall surface (i.e. parallel to baseplate 110) so that the auxiliary port can be accommodated with reduced outward projection of face plate 130 from a wall surface.

Auxiliary ports 111 may be supported relative to base 110 either directly or indirectly. In some embodiments, auxiliary ports 111 are mounted to a carrier printed circuit board 210. Auxiliary ports 111 may be attached to circuit board 210, typically by soldering. Means of attaching auxiliary ports 111 or carrier printed circuit board 210 to base 110 may include, but are not limited to, screws, rivets or similar mechanical fasteners, heat stakes, interference fit, ultrasonic welds or adhesives. Attachment means for securing auxiliary ports 111 to base 110, either directly or indirectly, are made robust enough to withstand repeated plug insertions and removals. In preferred embodiments, additional mechanical features may also be included in base 110 to assist with aligning and retaining auxiliary ports 111 or carrier printed circuit boards 210 to base 110. Auxiliary ports 111 are mounted such that they align with openings on the base 110 and/or faceplate 130 such that plugs may be freely inserted into auxiliary ports 111.

In alternative embodiments, auxiliary ports 111 and/or carrier printed circuit boards 210 are secured to faceplate 130 instead of base 110. In such an embodiment, auxiliary ports 111 may be aligned with corresponding openings in faceplate 130 to enable plug insertion/removal, with auxiliary ports 111 disposed along one or more of the sides and/or top/bottom surfaces of the multifunctional receptacle 100, rather than on the front face on which AC electrical outlets 140 are disposed. Auxiliary ports 111 may be accessed without being obstructed by oversized plugs that may be inserted into AC electrical outlets 140. Additionally, auxiliary ports 111 are concealed or at least not prominent when receptacle 100 is viewed from the front. In some embodiments, edges of faceplate 130 slightly overhang auxiliary ports 111 as shown, for example, in FIGS. 1 and 3.

In embodiments wherein auxiliary ports 111 are attached to one or more carrier printed circuit boards 210, the carrier printed circuit boards 210 may include connections to input power and/or signal sources 220 and electrical circuit traces for delivering power and/or signals to each of the auxiliary ports 111. Means of electrically connecting to the carrier printed circuit board 220 may include exposed solder pads for establishing a soldered connection to, or for making contact with a spring-loaded contact connector, dedicated board-mounted connectors, wires, ribbon cables or equivalent means of establishing an electrically conductive connection. Optionally, additional electrical circuit components may be disposed on the carrier printed circuit board 210 as may be required to filter, process, regulate, shield or otherwise manipulate electrical power/signals flowing to/from auxiliary ports 111 or wirelessly broadcast signals for communicating with auxiliary devices via RF, Wi-Fi, Bluetooth™, Zigbee™, or similar, signals.

Auxiliary ports 111 may be either powered or unpowered ports. FIG. 1 merely illustrates one example embodiment in which auxiliary ports 111 are USB ports. This embodiment is intended to be illustrative only and should not be interpreted as restrictive. In embodiments wherein auxiliary ports 111 are DC power ports, preferred embodiments may utilize any number of female USB connectors of type A, B, C (or others such as may become widely available in the future), coaxial connectors or proprietary form factor connectors.

In embodiments wherein auxiliary ports 111 include signal pass-thru ports, any port geometry and type is possible including, but not limited to, USB, HDMI, VGA, DVI, display port, component video, S-video, composite video/audio, mini audio, digital audio, RJ11, RJ45, and others. Combinations of any of the above, or other, ports are anticipated and it is not a restriction of the present invention that all ports be of identical type. For example, powered and unpowered ports may both be present alongside each other within the same multifunctional receptacle 100.

Mating connectors may be inserted into auxiliary connectors 111 in a direction generally parallel to the wall (and to the front face of faceplate 130).

Power and/or signal lines connecting to auxiliary ports 111, or carrier printed circuit board 210, originate within the in-wall portion 120 of the multifunctional electrical receptacle 100. In-wall portion 120 includes terminals 300 (FIG. 3) for connecting standard building wiring including AC power wires and, optionally, other data or signal wires to the multifunctional receptacle 100 and includes electrical connections to AC outlets 140 for powering said outlets.

Figure 4:
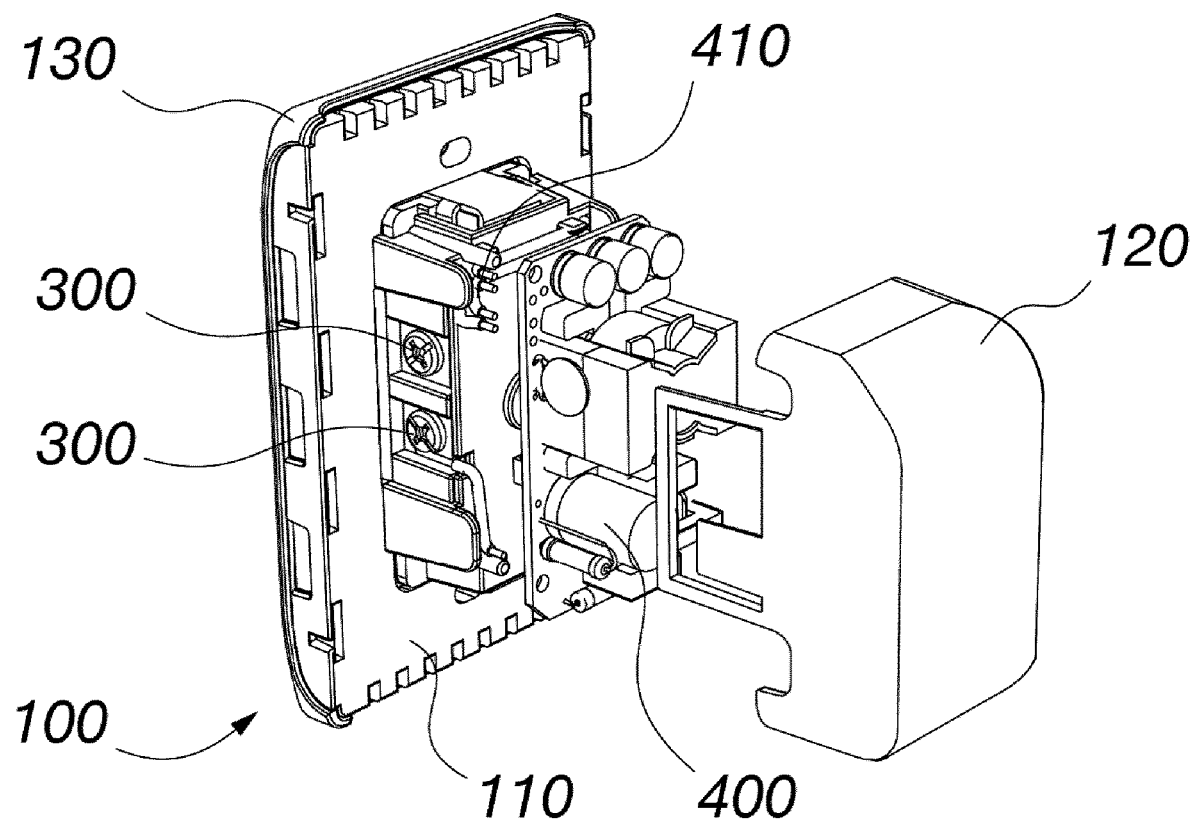
FIG. 4 is a second exploded perspective view of the receptacle of FIG. 1 with a rear cover removed to reveal internal components.

If any of the auxiliary ports 111 are powered DC ports, in-wall portion 120 includes electronic components and circuits 400 (FIG. 4) for converting input AC power to an appropriate DC voltage and means for delivering DC power 410 to auxiliary ports 111. This means may, for example, comprise a power supply, such as a switched mode power supply, a transformer/rectifier combination, or the like.

If any of the auxiliary ports 111 are signal connectors, in-wall portion 120 may also include one or more input connectors for supplying input signals to the multifunctional receptacle, optional electronics for filtering or processing such signals, and conductors for delivering the signals to auxiliary ports 111.

Figure 3:
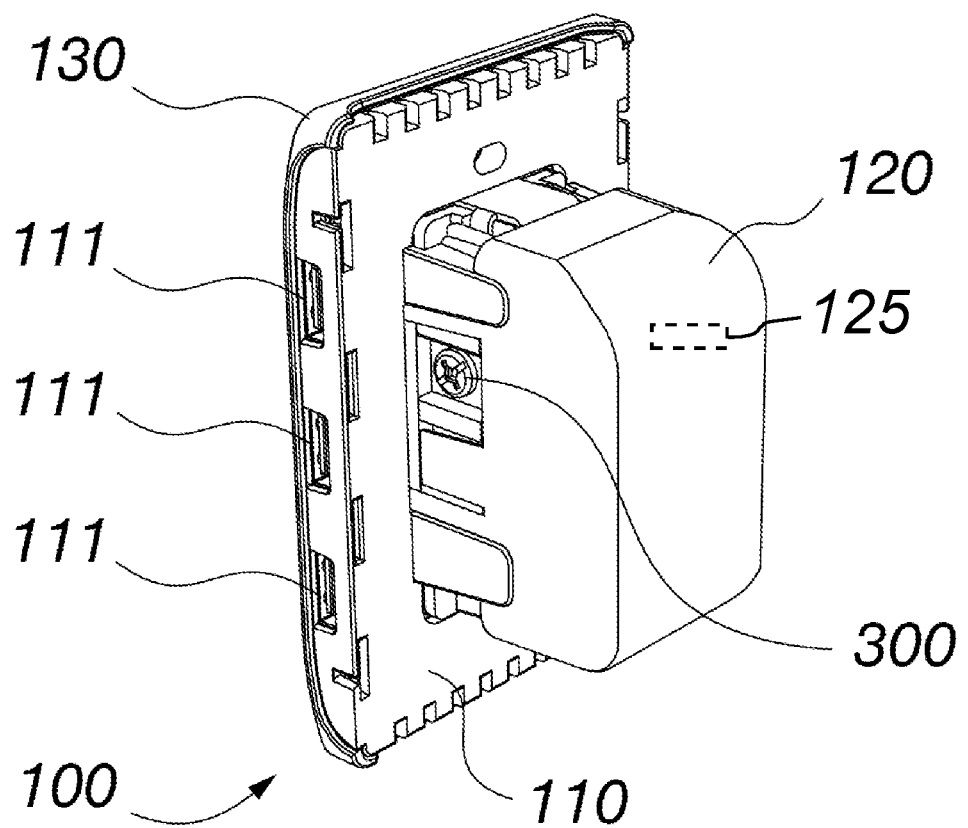
FIG. 3 is a rear-perspective view of the receptacle of FIG. 1.

Both powered DC ports and unpowered signal ports may be present within one multifunctional receptacle 100 in which case AC-DC power conversion and signal handling electronics may both be present within in-wall portion 120. Optionally, these electronics may also or in the alternative include additional functions, such as surge protection for any electronics plugged into the AC outlets or DC auxiliary ports, noise reduction filters, antennae, and/or wireless radios for communicating with other electronic devices. An example wireless radio 125 is schematically illustrated in FIG. 3.

Power and/or signal connections 410 from in-wall portion 120 to auxiliary ports 111 or carrier circuit boards 210 may comprise direct solder connections, mating electrical connectors, discrete wires, ribbon cables, printed circuit board(s) or other equivalent means of establishing electrically-conductive connections, for example.

In-wall portion 120 may either be integral with base 110 or attached thereto with snaps 500, or other removable or irremovable attachment means including, but not limited to, screws, rivets or similar mechanical fasteners, heat stakes, interference fit, ultrasonic welds or adhesive. In-wall portion 120 is sized to fit within a standard electrical outlet box and is fully concealed within the wall once base 110 is wall-mounted by securing to an electrical outlet box. In-wall portion 120 is typically fabricated from similar materials as base 110.

Figures 5, 5A:
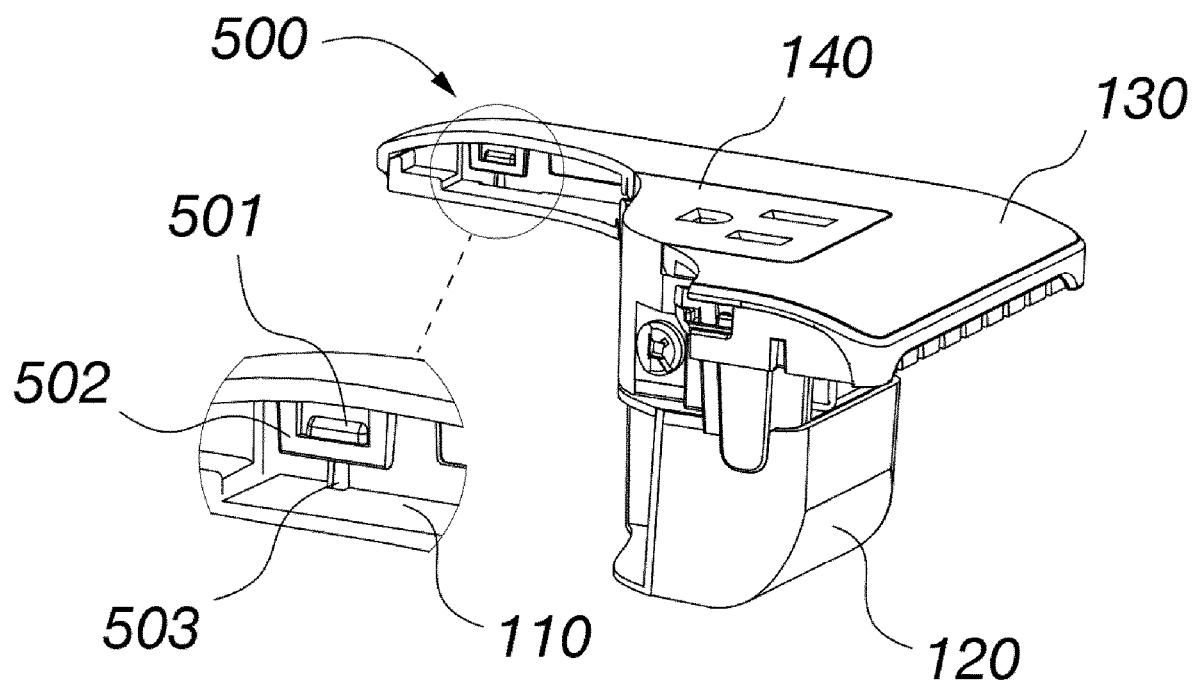
FIG. 5 is a detail view of snap fits according to an example embodiment for implementing a detachable faceplate.
FIG. 5A is a magnified view of a portion of FIG. 5

Faceplate 130 serves as both an aesthetic and a safety cover over base 110 and all components, wiring and connectors therein. Faceplate 130 and base 110 are shaped such that they can be fitted together in a complementary manner. Means for securing faceplate 130 to base 110 may be incorporated into the design of either, or both, components. In one embodiment, illustrated in FIG. 5, the means for securing faceplate 130 to base 110 comprises a plurality of mechanical snap fits 500 along the perimeter of the faceplate 130 and base 110. Each snap fit 500 comprises a snap loop structure 502 on faceplate 130 and mating snap hook structure 501 on base 110; with one or both features having a tapered leading edge such that they may be engaged by pressing the two parts together. To disengage the snaps and release the faceplate 130 from base 110, a small, flat instrument, such as a flathead screwdriver, may be inserted into release slots 503 to displace the snap loop 502 away from the snap hook 501 while pulling the faceplate 130 away from base 110. In one embodiment, shown in FIGS. 2 and 5, such snaps fits 500 are disposed near each corner of the faceplate 130 and base 110 with additional similar snap hook features disposed between them to ensure a uniform, tight engagement between faceplate 130 and base 110. Alternative embodiments utilize other means of mechanically attaching the faceplate 130 and base 110. For example, face plate 130 may be connected to base 110 using variations on the snap fits 500 such as inverting the design such that snap loop 502 is disposed on base 110 and snap hoop 501 is part of faceplate 130, mechanical fasteners such as screws, rivets, magnetic retention systems, adhesives, hook and loop fasteners, snaps, and others as should be obvious to those skilled in the art.

Faceplate 130 is typically fabricated from an electrically insulating material, such as a thermoplastic or thermoset material compatible with relevant electrical safety standards and consumer product safety requirements, or be made of metal, wood, ceramic, glass or composite materials provided they do not create electrical short circuits or pose potential fire, or other, hazards that may preclude the receptacle from meeting applicable electrical safety standards. Faceplate 130 may also be coordinated in coloring, pattern, texture or material to match the décor of the building in which it is installed or adorned with decorative patterns, designs or decals for personalization.

Figure 6:
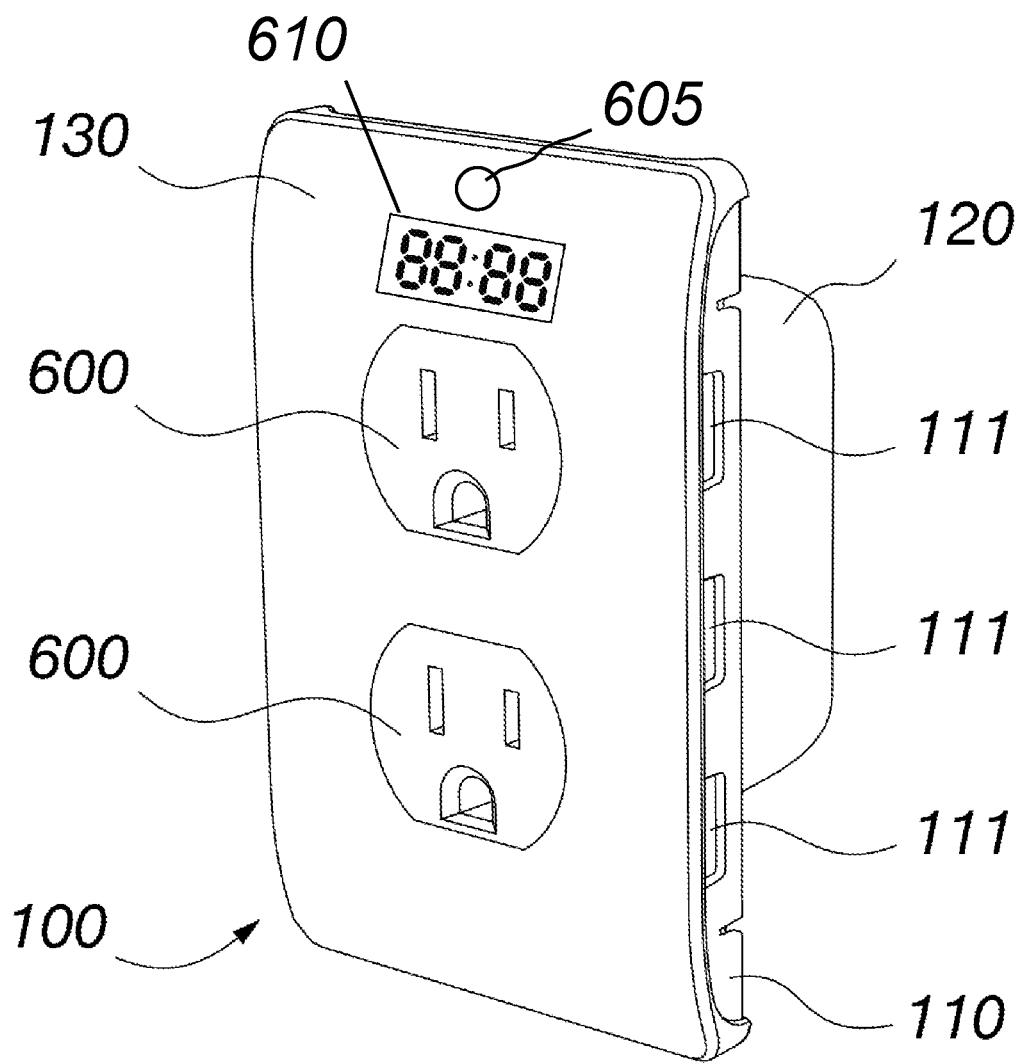
FIG. 6 illustrates a multifunction receptacle incorporating an alternative style of grounded AC electrical outlets.
Figure 7:
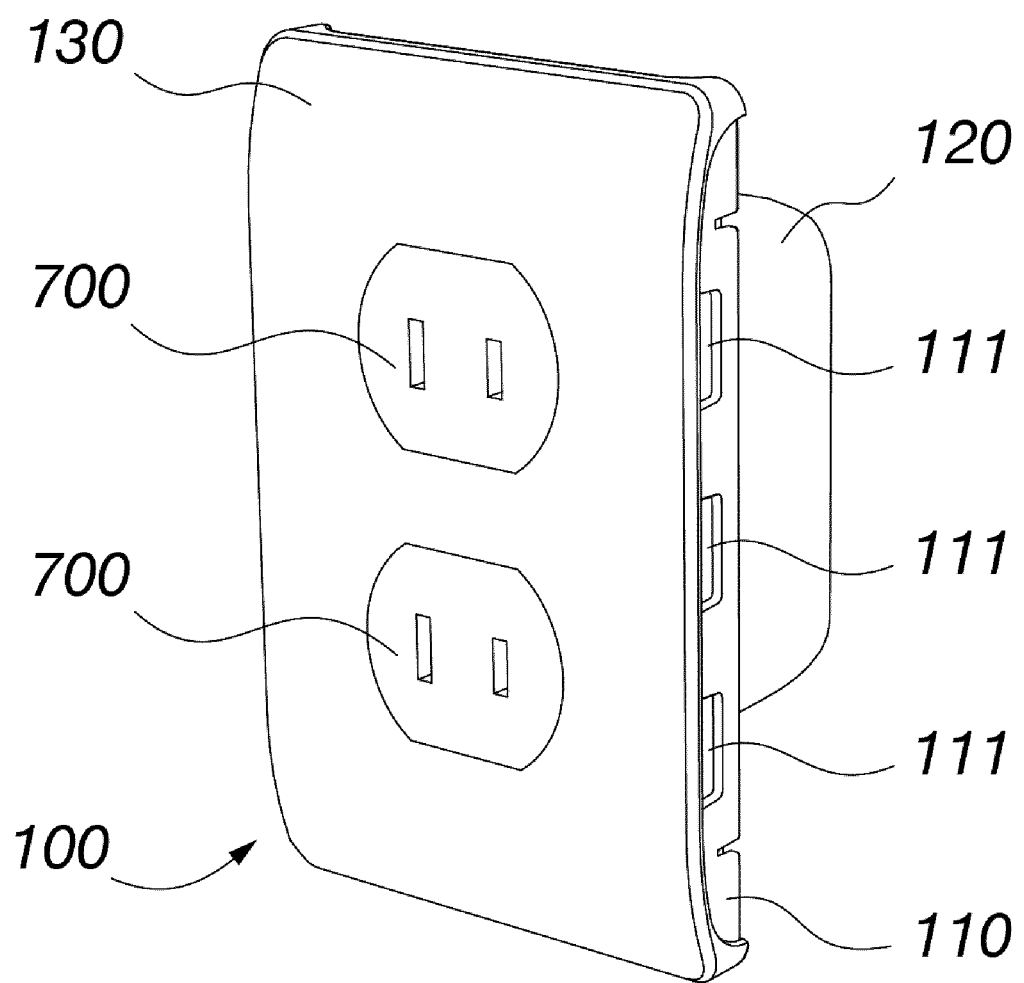
FIG. 7 illustrates a multifunction receptacle incorporating an alternative style of ungrounded AC electrical outlets.
Figure 8:
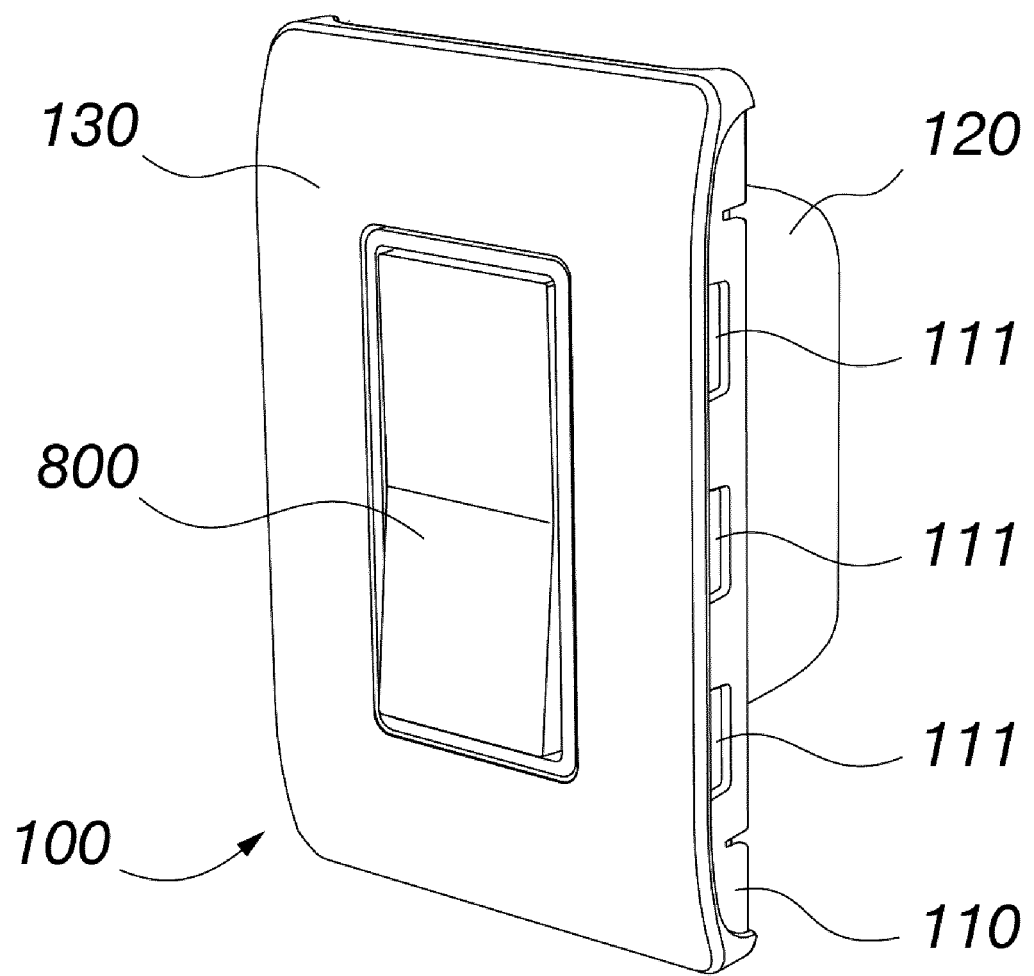
FIG. 8 illustrates a multifunction receptacle incorporating a decora-style light switch.
Figure 9:
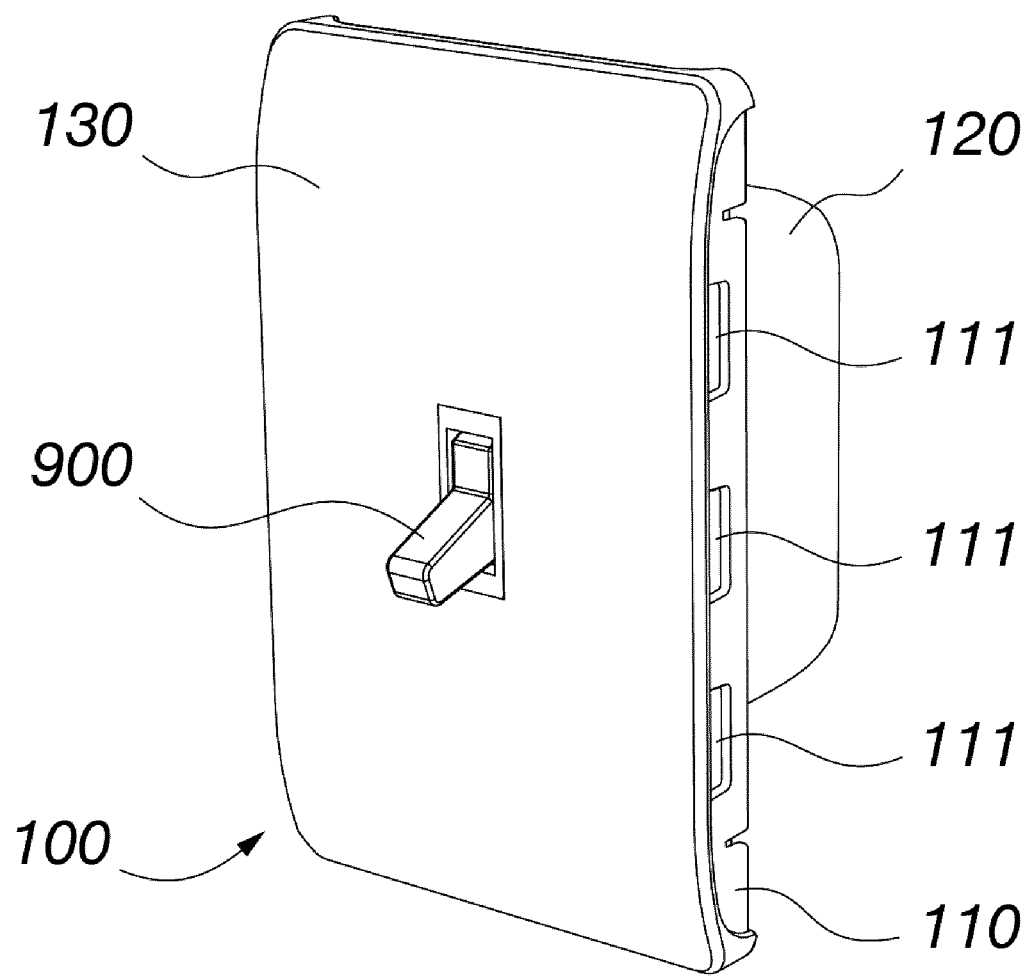
FIG. 9 illustrates a multifunction receptacle incorporating a toggle-style light switch.
Figure 10:
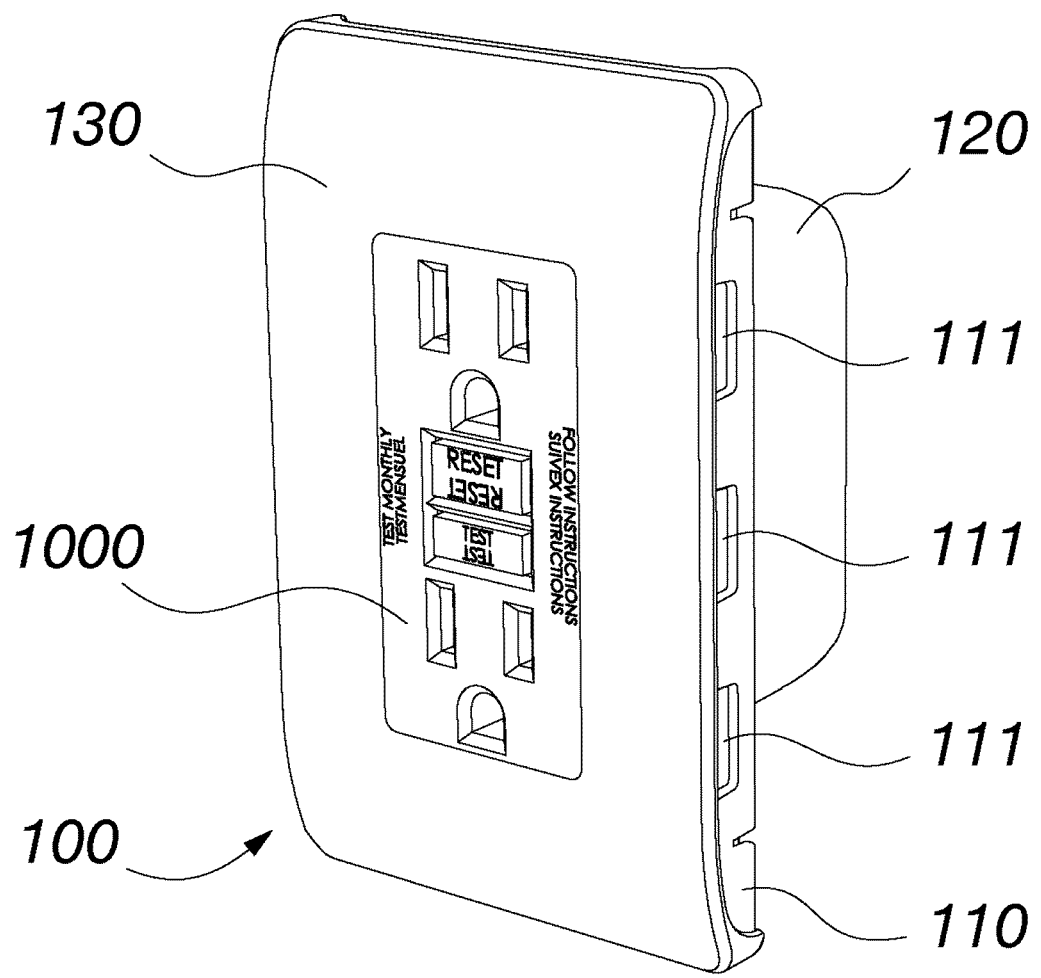
FIG. 10 illustrates a multifunction receptacle incorporating an alternative style of ground fault circuit interrupter (GFCI) receptacle.
Figure 11:
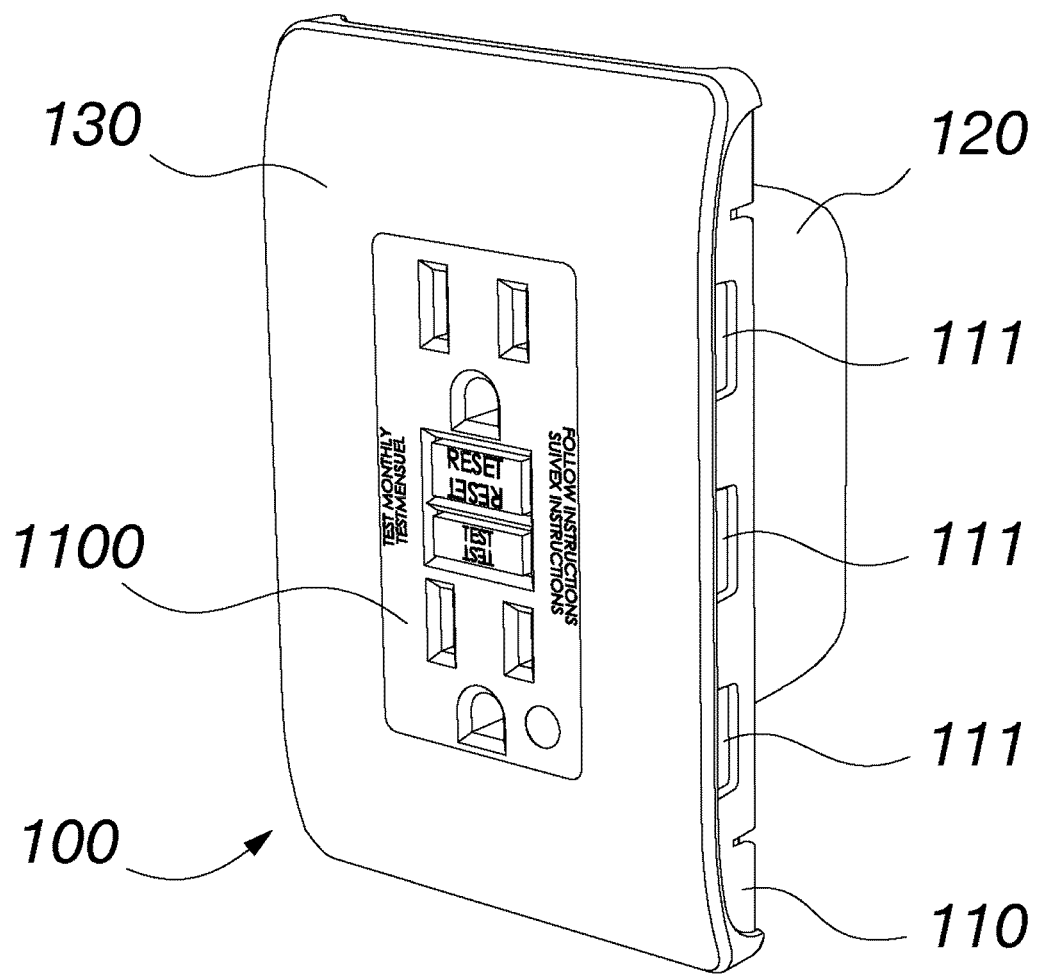
FIG. 11 illustrates a multifunction receptacle incorporating an alternative style of hospital-grade ground fault circuit interrupter (GFCI) receptacle.

Receptacles according to additional example embodiments are shown in FIGS. 6-9. FIGS. 6-7 illustrate embodiments in which faceplate 130 is fashioned to accept alternate styles of duplex AC outlets 600, 700, including both grounded 3-prong outlets 600 and ungrounded 2-prong outlets 700. FIGS. 8-9 illustrate embodiments in which multifunctional electrical receptacle 100 may be used in electrical switch applications using either a decora-style switch 800 or a toggle-style switch 900. Switches 800 or 900 may be connected to control loads such as lights, fans, appliances, etc. in the normal manner. The foregoing additional embodiments are all meant as a few illustrative examples of the many other embodiments of the present invention that are possible. Many other variations and modifications and other uses will become apparent to those skilled in the art, including but not limited to additional embodiments not shown. For example, the AC outlets 140, 600, 700 may be replaced by other devices that may desirably be wall-mounted within a structure. Such devices include but are not limited to one or more digital displays, such as a thermostat, timer, programmable lighting controller, dimmer light switch, internet appliance or the like wherein a primary AC-powered utility device is augmented by predominantly perpendicularly-mounted auxiliary ports. In the FIG. 6 example, receptacle 100 comprises a sensor 605 which may be a camera, an occupancy sensor, a motion detector, a heat sensor, or a remotely-controllable switch. Receptacle 100 further comprises a digital display 610 which may be a display of a thermostat, programmable timer, lighting controller, camera, or graphical user interface.

INTERPRETATION OF TERMS

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g. a circuit board, connector, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A multifunctional electrical receptacle for mounting to the wall of a structure, the structure being wired to provide AC current, the receptacle comprising:
    a base adapted to attach to the wall of the structure;
    a removable faceplate attached to the base, the faceplate having a front face;
    a primary utility device accessible on the front face;
    a plurality of female auxiliary ports disposed along one or more lateral peripheral edges of the base around a periphery of the front face; and
    terminals for connecting the primary utility device to a source of AC current, wherein:
        the front face of the faceplate has a surface larger than a forward-facing portion of the base so that a portion of the faceplate overhangs the plurality of female auxiliary ports;
        when the receptacle is in a mounted configuration, the plurality of female auxiliary ports are positioned a first distance towards the wall from the front of the faceplate and one or more corners of the faceplate extends a second distance towards the wall from the front of the faceplate, the second distance being greater than the first distance;
        when the receptacle is in the mounted configuration, the one or more corners of the faceplate extending the second distance towards the wall are positioned over one or more corners of the base and adjacent the plurality of female auxiliary ports; and
        when the receptacle is in the mounted configuration, the portion of the faceplate that overhangs the plurality of female auxiliary ports extends at most a third distance towards the wall, the third distance being less than the first distance.

2. The multifunctional receptacle of claim 1 wherein the primary utility device comprises a duplex AC electrical outlet, a ground fault circuit interrupter (GFCI), a light switch, and/or a digital display.

3. The multifunctional receptacle of claim 1 comprising a digital display, wherein the digital display is a display of a thermostat, programmable timer, lighting controller, camera, or graphical user interface.

4. The multifunctional receptacle of claim 1 wherein the auxiliary ports comprise powered DC power outlets and the multifunctional receptacle includes an AC-DC power converter connected to supply low voltage DC current at the auxiliary ports.

5. The multifunctional receptacle of claim 1 wherein one or more of the auxiliary ports is an unpowered signal port; wherein the signal port comprises an audio, video or network connector and the multifunctional receptacle includes one or more input connectors accessible for attaching one or more signal wires within the structure walls for supplying signals to and/or receiving signals from the one or more signal ports.

6. The multifunctional receptacle of claim 1 comprising a wireless data transmitter and/or a wireless data receiver.

7. The multifunctional receptacle of claim 1 comprising a security device, wherein the security device comprises a camera, an occupancy sensor, a motion detector, or a heat sensor, and wherein the security device further comprises a communication module.

8. Apparatus comprising:
an in-wall portion sized for insertion into an electrical utility box mounted in a wall of a structure, the electrical utility box having a forward-facing opening;
the apparatus comprising a base attachable to the electrical utility box with the in-wall portion received within the electrical utility box;
electrical terminals on the in-wall portion for connection to AC power wires within the electrical utility box;
a power converter having an AC input connected to receive AC power from the electrical terminals;
a faceplate attached to the base, the faceplate having a front surface larger than the forward-facing opening of the electrical utility box, when the apparatus is installed in the electrical utility box, the front surface spaced apart from the wall by lateral peripheral edges of the apparatus; and
a plurality of auxiliary ports disposed along one or more of the lateral peripheral edges of the apparatus, one or more of the auxiliary ports connected to receive power from an output of the power converter, the faceplate overhanging the plurality of auxiliary ports;
wherein:
when the apparatus is installed in the electrical utility box, the plurality of auxiliary ports are positioned a first distance towards the wall from the front surface of the faceplate and one or more corners of the faceplate extends a second distance towards the wall from the front surface of the faceplate, the second distance being greater than the first distance;
when the apparatus is installed in the electrical utility box, the one or more corners of the faceplate extending the second distance towards the wall are positioned over one or more corners of the base and adjacent the plurality of auxiliary ports; and
when the apparatus is in the mounted configuration, the portion of the faceplate that overhangs the plurality of female auxiliary ports extends at most a third distance towards the wall, the third distance being less than the first distance.

9. The apparatus according to claim 8 wherein the power converter is an AC to DC power converter and the power converter is connected to supply DC power to the one or more of the auxiliary ports.

10. The apparatus according to claim 8 wherein the faceplate projects no more than 2½ cm outwardly from a front surface of the wall, or wherein the faceplate projects no more than 1½ cm outwardly from a front surface of the wall.

11. The apparatus according to claim 8 wherein:
the auxiliary ports have a long dimension and a short dimension and are oriented with the long dimension parallel to the wall surface;
the plurality of auxiliary ports are oriented to receive corresponding mating connectors inserted in a direction parallel to the wall;
the lateral peripheral edges of the apparatus on which the auxiliary ports are disposed are oriented generally perpendicularly to the front surface;
the faceplate is rectangular, having two longer sides and two shorter sides and the auxiliary ports are located on one or both of the lateral peripheral edges of the apparatus that extend along the longer sides of the faceplate;
the apparatus provides one or more of the auxiliary ports on each of at least two of the lateral peripheral edges of the apparatus; and/or
the electrical terminals include an electrical terminal on a first side of the in-wall portion and an electrical terminal on a second side of the in-wall portion.

12. The apparatus according to claim 8 wherein the apparatus has between two and eight of the auxiliary ports.

13. The apparatus according to claim 8 comprising an AC power receptacle on the front surface, the AC power receptacle connected to receive AC electrical power by way of the electrical terminals.

14. The apparatus according to claim 8, wherein:
the apparatus comprises a camera, the camera connected to receive power by way of the electrical terminals and having a lens on the front surface of the faceplate;
the front surface of the faceplate carries one or more of: a digital display; a switch; a user interface, a user control, a motion sensor, an occupancy sensor, and a heat sensor;
the apparatus comprises a wireless data communication module connected to receive power by way of the electrical terminals; and/or
the apparatus comprises a thermostat, a security camera, a remotely-controllable switch, a programmable timer or a lighting controller connected to transmit or receive data by way of the data communication module.

15. The apparatus of claim 8 wherein one or more of the auxiliary ports is an unpowered signal port; and wherein the signal port comprises an audio, video or network connector and the apparatus includes one or more input connectors accessible for attaching one or more signal wires within the electrical utility box for supplying signals to and/or receiving signals from the signal port.

16. Apparatus useful for covering an electrical utility box, the apparatus comprising:
a base apertured to receive fasteners for attaching the base to the electrical utility box;
a rectangular faceplate attachable to the base, the faceplate having a front surface larger than a forward facing portion of the base;
peripheral edges extending around the base and oriented generally perpendicularly to the faceplate;
a plurality of auxiliary ports located on one or more of the peripheral edges, the faceplate overhanging the plurality of auxiliary ports;
wherein:
when the faceplate is attached to the base, the plurality of auxiliary ports are positioned a first distance towards the electrical utility box from the front surface of the faceplate and one or more corners of the faceplate extends a second distance towards the wall from the front surface of the faceplate, the second distance being greater than the first distance; and
when the faceplate is attached to the base, the one or more corners of the faceplate extending the second distance towards the wall are positioned over one or more corners of the base and adjacent the plurality of auxiliary ports; and
when the apparatus is in the mounted configuration, the portion of the faceplate that overhangs the plurality of female auxiliary ports extends at most a third distance towards the wall, the third distance being less than the first distance.

17. The apparatus according to claim 16 wherein:
the front surface is formed with an aperture shaped to expose an electrical device, wherein the aperture is shaped to expose an electrical power receptacle; and/or
the auxiliary ports comprise USB ports.

18. The apparatus according to claim 16 wherein the faceplate projects no more than 2½ cm outwardly from the base, or wherein the faceplate projects no more than 1½ cm outwardly from the base.

19. The apparatus according to claim 16 wherein:
the auxiliary ports have a long dimension and a short dimension and are oriented with the long dimension parallel to a front surface of the base;
the plurality of auxiliary ports are oriented to receive corresponding mating connectors inserted in a direction parallel to the front surface of the faceplate;
the faceplate is rectangular, having two longer sides and two shorter sides and the auxiliary ports are located on one or both of the peripheral edges that extend along the longer sides of the faceplate; and/or
the apparatus has between two and eight of the auxiliary ports.

* * * * *